UNITED STATES PATENT OFFICE.

WILLIS F. WASHBURN, OF FREDRIKSSTAD, NORWAY, ASSIGNOR TO TITAN CO. A/S, OF CHRISTIANIA, NORWAY.

TITANIUM-OXIDE PIGMENT AND METHOD OF PRODUCING THE SAME.

1,412,027.  Specification of Letters Patent.  Patented Apr. 4, 1922.

No Drawing.   Application filed January 23, 1920.  Serial No. 353,639.

*To all whom it may concern:*

Be it known that I, WILLIS F. WASHBURN, a citizen of the United States of America, and a resident of the city of Fredriksstad, Kingdom of Norway, have invented certain new and useful Improvements in Titanium-Oxide Pigments and Methods of Producing Same, of which the following is a specification.

This invention relates to pigments such as are commonly employed in paints, enamels, printer's ink, etc., and more particularly those containing titanium oxide.

The object of the invention is an improved pigment of this class as well as the process for manufacturing same.

I obtain my improved product by employing phosphoric acid or a phosphate in the manufacture of my titanium oxide pigment. The phosphoric acid or phosphate I have found, imparts to the pigment certain desirable qualities which I believe cannot be obtained without the use of this reagent.

The product will be more soft, smooth and have a whiter and more pleasing color than if manufactured in the ordinary way.

I am aware that it has been suggested to use phosphoric acid or phosphates as an ingredient in a titanium oxide pigment as described in United States Letters Patent No. 1,360,737, November 30, 1920, in order to obtain a more stable product, but my process differs from that described in said United States Letters Patent both in the method of manufacture and the result obtained.

When working according to my invention I may use as raw material any highly concentrated titanic oxide product, but I prefer to employ titanium hydrates precipitated from a solution of a titanium salt because of their purity. To this raw material I add phosphoric acid or a phosphate, preferably calcium phosphate in quantities varying from 1% of the $TiO_2$ present up to 50%. Even a small percentage will cause a perceptible improvement in the final product, but I prefer, however, to use quantities ranging substantially from 10 to 30% of the $TiO_2$ present, the percentage being calculated on $P_2O_5$ added, although experiments have indicated that much larger quantities may be added if desired.

The materials are now thoroughly mixed and heated to drive off the water present and if desired the heating may be continued until crystallization of $TiO_2$ takes place.

The composition of the final product obtained according to my invention will vary within wide limits depending upon the raw materials employed.

In order to illustrate my invention the following specific example is given:

Finely pulverized ilmenite containing approximately 40% $TiO_2$ and 32% of iron is mixed with equal parts by weight of 96% $H_2SO_4$ and the mixture heated until a reaction takes place and a solid cake is formed, as set forth in United States Letters Patent No. 1,360,737, November 30, 1920. The cake which contains sulphates of titanium and iron is crushed and brought into suitable containers where it is lixiviated with water according to the counter current principle. The amount of water employed is regulated so as to obtain a solution having a specific gravity from 1.4 to 1.6 and containing approximately 120 g. $TiO_2$ per liter. The solution thus obtained is subjected to electrolysis whereby all of the iron present is reduced to the ferrous state and a small amount of titanium is reduced to the trivalent condition. The reduced solution is brought into a lead lined vat equipped with a steam coil and boiled until precipitation of the titanium hydrate is effected. The solution is maintained at boiling temperature for about one hour after precipitation has started and the precipitate separated from the solution by means of settling or filtration and thoroughly washed with water.

The precipitate thus obtained has a pure white color and consists essentially of titanium hydrate containing traces of iron and a small amount of the $SO_4$ radical either in the form of a basic titanium sulphate or as free sulphuric acid. The water contents of the precipitate may vary but I generally employ a precipitate having approximately the following composition:

Per cent.
$TiO_2$—23.3
Fe — 0.04
$SO_3$ — 1.66
$H_2O$—75.0

I bring this precipitate into a suitable container provided with a stirring apparatus and add to the mass finely pulverized $BaCO_3$ or $CaCO_3$ as described in United States Letters Patent No. 1,343,469 June 15, 1920, in a quantity corresponding to the theoretical amount required to form $BaSO_4$ or $CaSO_4$ with the $SO_4$ radical present in the precipitated hydrates.

After a thorough mixing I add to the mass 15% $P_2O_5$ (calculated on the $TiO_2$ present) in the form of a pulverized calcium phosphate. The phosphate now employed has the following composition:

Per cent.
$P_2O_5$—38.03
$CaO$ —35.60
$FeO$ — 0.7
24.90 loss on ignition.

The mass is further stirred until a homogeneous mixture is obtained.

The mixture thus obtained is now pumped into a container from which it is fed into a calcining furnace of the rotary type and heated by means of hot gases passing through the furnace. The pulp will, when passing through the furnace, gradually become heated. First the water will evaporate and when the temperature of the mass reaches about 700° C. practically all water of hydration will be driven off. I prefer, however, to raise the temperature up to 950° C. and to regulate the feed and the temperature of the gases so as to maintain the mass at 950° C. for approximately one hour. In this manner the $TiO_2$ present in wholly or partly converted into the crystalline modification as described in United States Letters Patent No. 1,348,129, July 27, 1920.

After leaving the furnace my product is cooled and if desired may be pulverized. It is a fine smooth powder of a pure white color, its whiteness surpassing that of other titanium pigments known to me. The color is, I believe, due to the addition of a phosphate during the process of manufacture as above described.

The product obtained by the above process is of a complex nature and it is very difficult to determine the exact molecular composition. The following is an approximate analysis:

67.8% $TiO_2$ ⎫
9.36% $BaSO_4$ ⎬ Insoluble in boiling HCl .5%.
2.30% $P_2O_5$ ⎭

2.53% $BaO$ ⎫
8.05% $CaO$ ⎬ Soluble in boiling HCl 5%.
7.91% $P_2O_5$ ⎭

2.1% loss of ignition.
100.05%

The pigment possesses great hiding power, surpassing that of zinc oxide and white lead. On account of its great hiding power and chemical inertness it is especially well adapted for mixing with other pigments, colors, extenders, and linseed oil or other vehicles to form paints or enamels.

Good pigments have been prepared according to my invention by employing phosphoric acid in place of the calcium phosphate and both with and without the addition of barium or calcium-carbonates.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of producing a pigment which comprises mixing a compound comprising essentially titanic oxide with a compound of phosphorus, and calcining the mixture at a temperature below the melting point thereof.

2. The process of producing a pigment which comprises mixing a compound comprising essentially titanic oxide with a compound of phosphorus, and calcining the mixture at a sufficiently high temperature to convert $TiO_2$ into a crystalline modification.

3. The process of producing a pigment which comprises mixing a compound comprising essentially titanic oxide with a compound of phosphorus and calcining the mixture at 950° C.

4. The process of producing a pigment which comprises mixing a compound comprising essentially titanic oxide with a phosphate and calcining the mixture at a temperature below the melting point thereof.

5. The process of producing a pigment which comprises mixing a compound comprising essentially titanic oxide with a phosphate, and calcining the mixture at a sufficiently high temperature to convert $TiO_2$ into a crystalline modification.

6. The process of producing a pigment which comprises mixing titanium hydrate with a compound of phosphorus and calcining the mixture at a temperature below the melting point thereof.

7. The process of producing a pigment which comprises mixing titanium hydrate with a compound of phosphorus, and calcining the mixture at a sufficiently high temperature to convert $TiO_2$ into a crystalline modification.

8. The process of producing a pigment which comprises mixing titanium hydrate with a phosphate, and calcining the mixture at a temperature below the melting point thereof.

9. The process of producing a pigment which comprises mixing titanium hydrate containing the $SO_4$ radical with the amount of a compound of an alkaline earth metal sufficient to neutralize the SO₄ radical present, and adding the phosphate.

10. The process of producing a pigment which comprises mixing titanium hydrate containing the SO₄ radical with the amount of a compound of an alkaline earth metal sufficient to neutralize the SO₄ radical present, and adding calcium phosphate.

11. The process of producing a pigment which comprises mixing titanium hydrate containing the SO₄ radical with the amount of a compound of an alkaline earth metal sufficient to neutralize the SO₄ radical present, adding a phosphate of an alkaline earth metal, and calcining the mixture.

12. The process of producing a pigment which comprises mixing titanium hydrate containing the SO₄ radical with the amount of BaCO₃ required to form BaSO₄ with the SO₄ radical present and then adding calcium phosphate in a quantity of 15% P₂O₅ calculated on TiO₂ present, and calcining the mixture.

13. The process of producing a pigment containing titanium, an alkaline earth metal and phosphorus each in a combined state, which comprises mixing a titanium oxygen compound with a phosphate of the alkaline earth metal.

14. The process of producing a pigment containing titanium, an alkaline earth metal and phosphorus each in a combined state, which comprises treating titanium hydrate containing an undesired acid substance with a compound of an alkaline earth metal which re-acts with the said acid substance to form a neutral and relatively insoluble salt of the said alkaline earth metal, adding a phosphate of an alkaline earth metal, and calcining the mixture.

15. As a new and useful article of manufacture a pigment comprising TiO₂ in the crystalline form and combined phosphorus.

16. As a new and useful article of manufacture a pigment comprising crystalline TiO₂ and a phosphate.

17. As a new and useful article of manufacture a pigment comprising TiO₂ and calcium phosphate.

18. As a new and useful article of manufacture a pigment comprising crystalline TiO₂ and calcium phosphate.

19. As a new and useful article of manufacture a pigment comprising titanium oxide, the sulphate of an alkaline earth metal and combined phosphorus.

20. As a new and useful article of manufacture a pigment comprising titanium oxide, barium sulphate and combined phosphorus.

21. As a new and useful article of manufacture a pigment comprising titanium oxide, barium sulphate and a phosphate.

22. As a new and useful article of manufacture a pigment comprising titanium oxide, barium sulphate, and calcium phosphate.

Signed at Christiania, Norway, this 24th day of December 1919.

WILLIS F. WASHBURN.